United States Patent [19]

Maurer

[11] 4,380,846
[45] Apr. 26, 1983

[54] IDLER PULLEY BELT DRIVE ARRANGEMENT FOR SUCTION CLEANER

[75] Inventor: Edgar A. Maurer, Canton, Ohio

[73] Assignee: The Hoover Company, North Canton, Ohio

[21] Appl. No.: 238,546

[22] Filed: Feb. 28, 1981

[30] Foreign Application Priority Data

Nov. 28, 1980 [GB] United Kingdom ............... 8038291

[51] Int. Cl.³ ............................................. A47L 5/30
[52] U.S. Cl. .................................................. 15/391
[58] Field of Search ................. 15/389, 390, 391, 412

[56] References Cited

U.S. PATENT DOCUMENTS

| 1,294,473 | 2/1919 | Kirby | 15/389 |
| 2,028,090 | 1/1936 | Frantz | 15/412 X |
| 3,188,681 | 6/1965 | Jepson et al. | 15/390 X |

FOREIGN PATENT DOCUMENTS 879627 11/1942 France ............... 15/390

Primary Examiner—Chris K. Moore
Attorney, Agent, or Firm—Gerald H. Kreske; Richardson B. Farley

[57] ABSTRACT

A driven agitator is powered by a pulley-belt arrangement including an idler pulley. Upon agitator stall condition slippage occurs at the idler pulley, preventing rotor stall of the driving motor.

8 Claims, 5 Drawing Figures

IDLER PULLEY BELT DRIVE ARRANGEMENT FOR SUCTION CLEANER

BACKGROUND OF THE INVENTION

1. Field of the Invention

This invention relates to floor care appliances having a driven agitator powered by a self and idler pulley arrangement and, more specifically, to a pulley and belt arrangement where a stalled agitator causes belt slippage at an idler pulley thereby protecting the rotor of the driving motor.

2. Summary of the Prior Art

It is known to utilize an idler pulley structure for driving of an igitator so that two belts are utilized, one extending from the idler pulley to the driving motor shaft and the other from the idler pulley to the agitator. However, heretofore it is not taught to utilize a conventional "V" belt and a flat elastomeric belt with different stretch characteristics and coefficients of friction to encourage slippage at a desired point upon agitator stall. It is also not taught to mount the idler pulley with a resiliently mounted motor to aid in alignment of the belt with the motor shaft and idler pulley.

Accordingly, it is an object of this invention to provide an idler pulley-belt configuration which encourages belt slippage at the idler pulley to prevent motor rotor stall.

It is an additional object of the invention to mount the idler pulley with the motor to aid in belt alignment.

It is a still further object of the invention to provide an improved belt-idler pulley arrangement for driving an agitator for a cleaner.

It is even a further object of the invention to prevent rotor stall in an agitator driving arrangement.

SUMMARY OF THE INVENTION

According to the present invention the suction cleaner motor includes a drive shaft which is connected to a pair of belts through an idler pulley so as to initiate actuation of the agitator for the suction cleaner. The idler pulley system is pivoted so as to permit the two belts to properly track during normal operation of the cleaner. The idler pulley, moreover, is pivotally attached to the motor itself thus keeping its pivot center and the motor shaft axis at a constant center to center distance. This enhances alignment and tracking of the belt extending therebetween, this belt in the present configuration being flat and therefore more critical in its alignment during driving of the idler pulley.

Extending forwardly from the idler pulley is a second belt of V configuration which is atached to the agitator. The first and second belts, respectively, are generally selected so that the first flat belt is of an elastomeric material while the second V-belt is a relatively inextensible composition. Preferably, with this selection of belts upon agitator stall, slippage occurs between the V-belt and its idler pulley to prevent the initiation of a stalled rotor condition at the motor shaft. This system also substantially eliminates broken or burned through belts.

It is felt that this occurs because the elastomeric stretchable flat belt has a non-linear deflection curve so that as the load on it increases the increment of stretch increases at a greater rate than linearly. At the same time the relatively unstretchable V-belt has a linear deflection characteristic. Then, upon loading of the V-belt by agitator stall, the flat belt tends to stretch a greater amount than the increment of stretch in the V-belt. This moves the idler pulley arrangement towards the agitator decreasing the center to center distance for the V-belt and loosening it so that it may slip on its particular idler pulley. Since slip occurs at this point, no stall occurs at the motor shaft so that the motor, itself, is protected.

DESCRIPTION OF THE DRAWINGS

Reference may now be had to the accompanying drawings for a better understanding of the invention, both as to its organization and function, with the illustration being only exemplary, and in which.

DETAILED DESCRIPTION OF THE INVENTION

Figure 1:
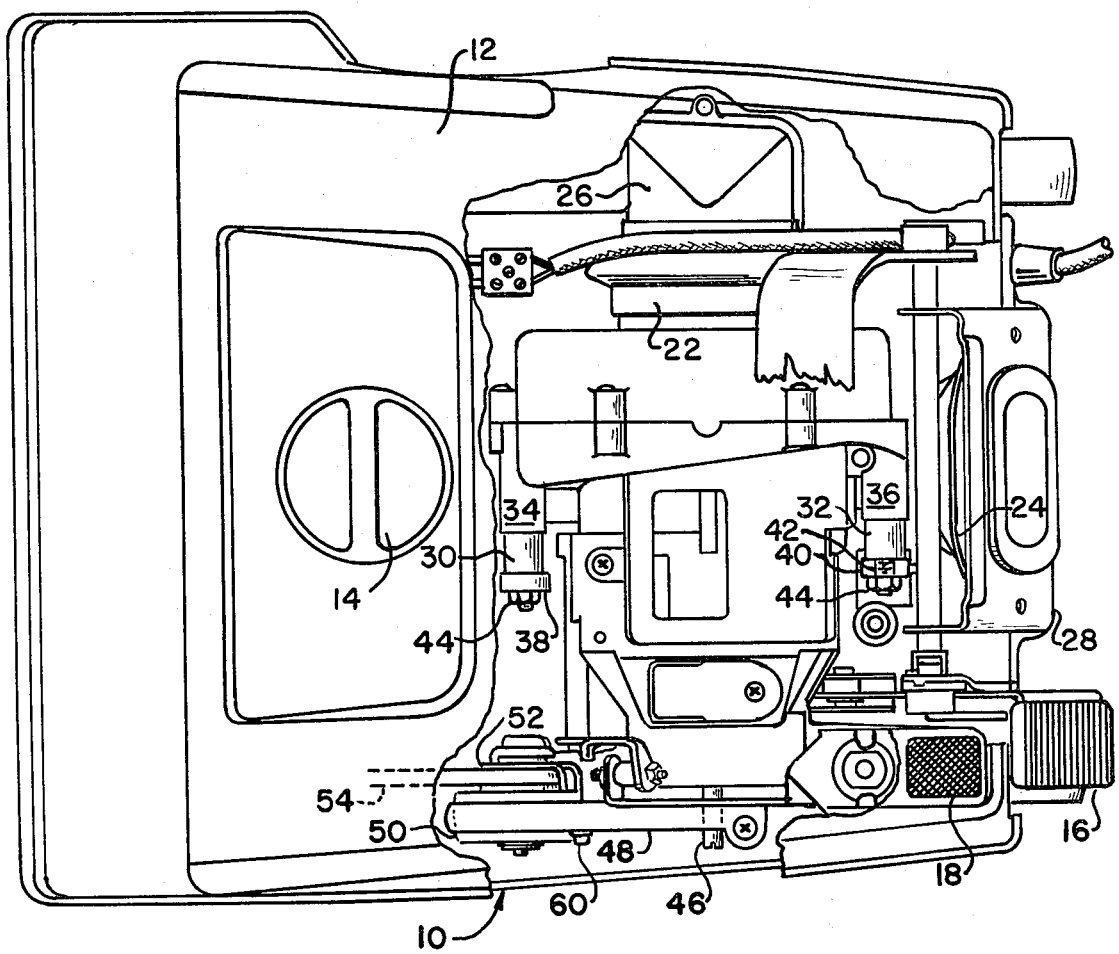
FIG. 1 is a plan view of the main body with the hood broken away to show many of the operating components for the cleaner.
Figure 2:
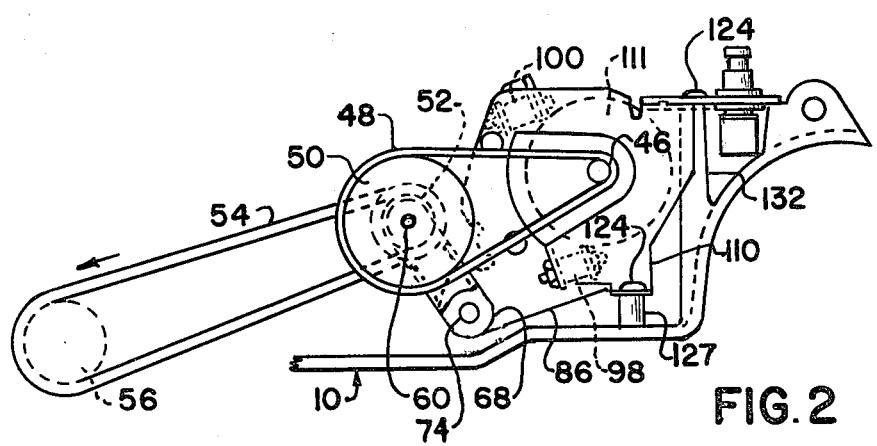
FIG. 2 is an elevational side view of the pulley drive system and the respective vibration isolators.

The cleaner can generally consist of a cleaner main body or bottom 10 covered by a hood 12 (shown fragmentarily), height adjustment means 14, a handle release 16 and a switch pedal 18 provided for on and off operation of the cleaner. All of these elements may be substantially conventional so no further description of them is offered.

The motor-fan system 20 includes bellows like isolation means 22 and 24 which communicate, respectively, with a duct 26 which may extend forwardly to the agitator aperture (not shown) in the cleaner main body 10 and to a bag flange 28. Thus, the motor-fan system 20 is resiliently mounted relative to the air delivery and vacuum system on the cleaner.

Figure 3:
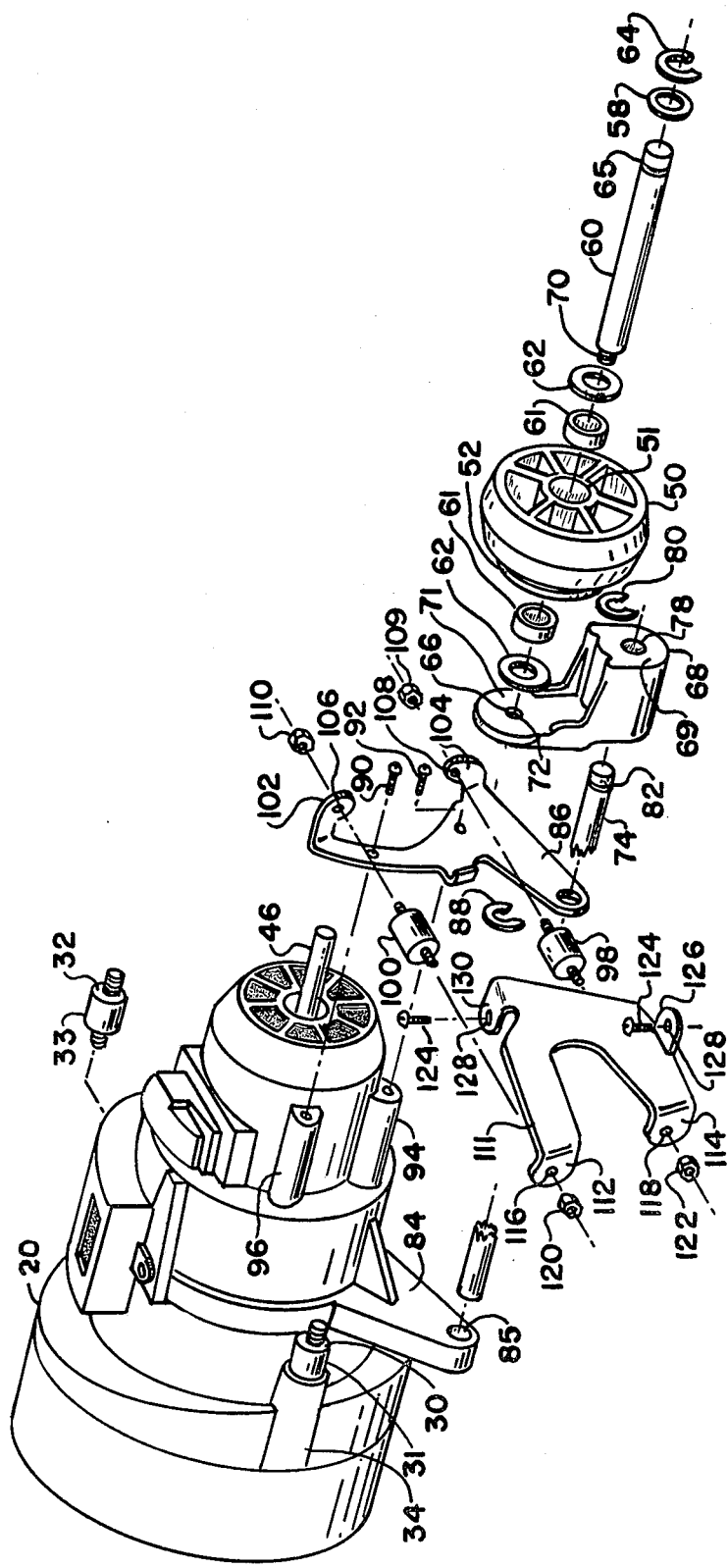
FIG. 3 is an exploded perspective view of the motor, idler pulley system, and associated parts.
Figure 4:
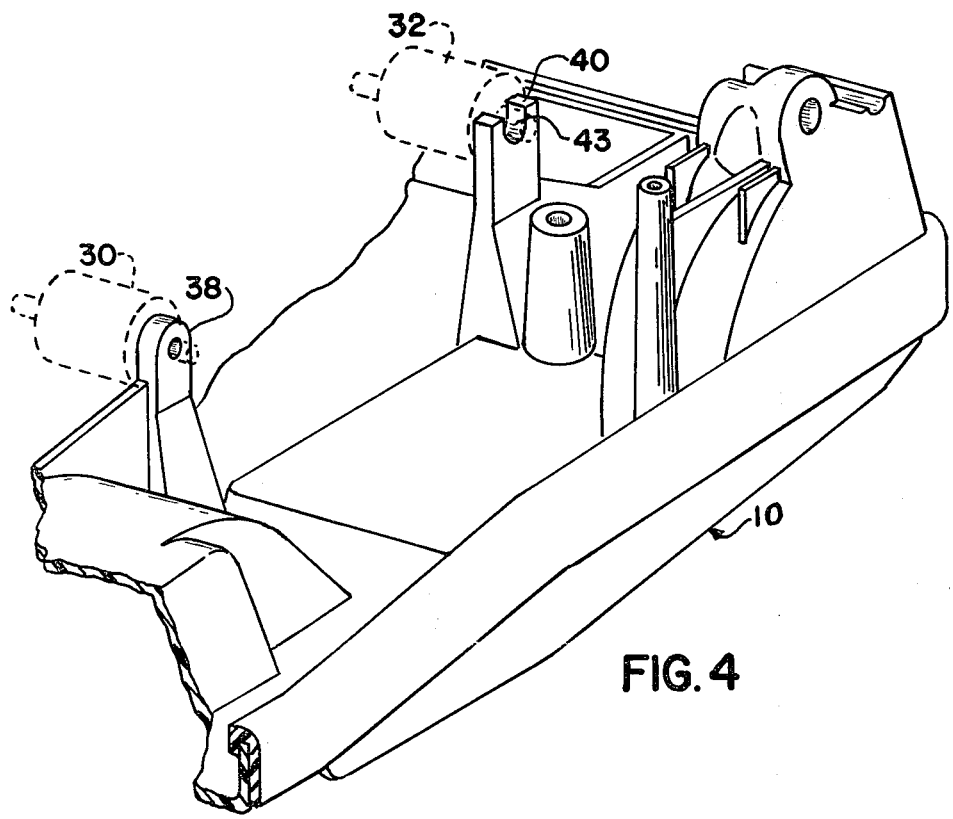
FIG. 4 is a partial perspective view of the main body and showing the motor mounting lugs.

Motor-fan system 20 is also isolated vibrationally from the cleaner main body 10 on its center of gravity by a pair of resilient mounts 30 and 32 which are centered deflected relative to the center of gravity of the motor-fan system 20. These mounts are received in a pair of bosses 34 and 36 fixed to the motor-fan system 20 and upwardly extending tabs 38 and 40 having a bore and an open slot 42 therethrough, respectively, which receive one of the threaded stud ends of each of the suppressors with the suppressors attached thereto by nuts 44, 44. The ends of the mount adjacent bosses 34 and 36 thread into these bosses. The vibration isolation mounts 30 and 32 can be seen in FIG. 3 to comprise central enlarged cylindrical isometric portions 31, 33 into whose ends have been moldably mounted threaded stud means so as to provide for the easy mounting of these vibration isolation mounts for isolation purposes. The mounts are substantially conventional and widely obtainable from a variety of commercial sources.

At the motor end of the motor-fan system 20 is a motor shaft 46 extending sidewardly towards the edge of the cleaner main body 10. An elastomeric belt 48 of flat, generally stretchable nature is mounted on this shaft and extends forwardly to be entrained at its other end around a pulley 50, this belt tensions the system. The pulley 50 is enlarged relative to the diameter of the shaft 46 so the speed reduction occurs between the shaft 46 and a hub 51 which integrally mounts the pulley 50. Integral with the pulley 50 is a smaller pulley 52 that trains a fiber reinforced V-belt 54 of relatively unstretchable nature of high load bearing characteristics that, in turn, extends forwardly so as to train around an agitator 56 having a larger diameter to drive it at a much reduced speed than the rotational velocity experienced by the motor shaft 46. This reduced speed of rotation of the agitator 56 provides a cleaner having a lower noise output based on the reduced noise generated by the slowed agitator and its beater bars and/or brushes.

Integral pulleys 50, 52 are journalled on an axle 60 to serve as a bearing means for rotation of the integral pulleys 50 and 52. This axle may be slightly pivoted towards the motor shaft 46 to provide an automatic take up when the belt is loaded. At its one end, the axle 60 has a washer 58 and an E-ring 64 mounted thereover, with the E-ring 64 mounted in a peripheral groove 65 in axle 60 to prevent movement of the integral pulleys 50, 52 off the end of the axle 60. The axle 60 is anchored at its other end by means of a bore 66 in a support bracket 68 of general L-shaped configuration with a tang 69 on the end of the horizontally extending leg of the L. The bore 66 is disposed in an upper leg 71 of the L with the shaft 60 placed therethrough and a threaded end 70 engaged by a threaded bore 72 to maintain the axle 60 in position for rotatably journaling the pulleys 50 and 52.

The bracket 68 is pivotally mounted relative to the motor-fan system 20 so as to permit alignment of the belts 48 and 54 over their respective pulleys so that the same may generally equalize their tensions, train properly and provide a rotational driving force to the agitator 56. This pivoting is occasioned by a shaft 74 which extends through a bore 78 in the generally L-shaped member 68. Support bracket 68 is prevented from sliding off the end of shaft 74 by means of an E-ring 80 which nests in a peripheral groove 82 adjacent the end of the shaft 74. Thus, the support bracket 68 is pivotable for the smooth running of the belts 48 and 54.

In order to maintain a constant axis of rotation of the shaft 74 relative to the axis of rotation of motor shaft 46 of motor-fan system 20, the shaft 74 is mounted therewith so that movement of the motor-fan system 20 on its resilient mounts 30 and 32 will not tend to misalign the axis of motor shaft 46 and the axis of the pulley 50. Thus, the flat elastomeric belt tends to track properly, completely independent of the movement of the motor-fan system 20 relative to the cleaner main body 10. This relative positioning is fairly critical since the use of a flat belt requires a more positive tracking arrangement than the use of the V-belt such as that that extends forwardly to the agitator 56.

The means for mounting the shaft 74 relatively fixed (centers) with the motor-fan unit 20 comprises an integral lug 84 extending radially outwardly from the housing of the motor-fan unit 20 and having a through bore 85 therein to receive a portion of the shaft 74 in a nested relationship. The shaft 74 extends outwardly and sidewardly from this retention means to extend through a bracket 86 fixed with the motor-fan system 20 and then through the bore 78 in the bracket 68. An E-ring 88 contacts the shaft 74 in a groove (not shown) on the inward side of the bracket 86 so that it and the E-ring 80 maintains the shaft 74 in its desired position with the bottom portion of leg 71 abutting the inside of the bracket 68 adjacent the bore 78. At the same time, the bracket 86, through a pair of bolts 90 and 92 which attach threadingly to a pair of lugs 94 and 96 fast with the motor housing, insure that the shaft 74 moves as the motor-fan unit 20 moves on its resilient mount. Then, the pulley 50 tracks properly with elastomeric flat belt 48 relative to the motor shaft 46 due to the pivotal motion of the support bracket 68 on a fixed center relative to the motor shaft 46.

The vibration isolation at the motor shaft end of motor-fan system 20 will now be detailed. The bracket 86 mounts one end of a pair of resilient mounts 98, 100 which are smaller sized than the resilient mounts 30 and 32 but have a similar construction. This is accomplished by a pair of integral sidewardly and outwardly extending lugs 102 and 104 disposed at the upper and lower reaches of the bracket 86 having, respectively, bores 106 and 108, for reception of one end of each of the resilient mounts 98 and 100. A pair of nuts 110 and 109 are screwingly threaded on the threaded studs of the resilient mounts 98 and 100 to pull the same against the inside surfaces of the tabs 102 and 104. The bracket 86, then, and the attached resilient mounts 98 and 100 form the isolation barrier between the attached motor-fan unit 20 and the cleaner main body 10 (by the utilization of a second bracket 111).

Bracket 111 includes a pair of sidewardly and inwardly extending tabs 112 and 114 with a corresponding pair of bores 116 and 118 through which the other threaded sides of the resilient mounts 100 and 98 extend. Nuts 120 and 122 thread on the threaded studs extending from the resilient mounts 100 and 98 to pull these mounts against the facing sides of the inwardly extending tabs 112, 114. The bracket 111 is secured to the main body 10 by the means of a pair of self tapping screws 124, 124 that extend through bores 128, 128 in sidewardly extending tabs 126 and 130 integral with the bracket 111 into posts 127 and 132, upwardly extending from the major portion of the main body 10. This arrangement secures a portion of bracket 111 relative to the main body 10. A second bore 128 extends through an inwardly horizontally extending tab 130, integral with the bracket 111, so as to be engaged in an upwardly extending post 132, integral, but upwardly disposed relative to the base portion of the main body 10.

The flat elastomeric belt utilized was composed of an ethylene propolene diene monomer and had a width of 0.375 inch (assembled), a thickness of 0.085 inch (assembled) and a length of 10.259 inches measured on the inside (assembled). The V-belt utilized was a fiber belt reinforced with polyester filaments. It had a width of 0.250 inch, a thickness of 0.156 inch and an outside length of 16.000 inches. It is available commercially in the U.S. as a Light-Duty Standard V-belt, 2L-160.

The motor shaft diameter was 0.315 inch. The idler pulley diameters were 2.080 inch and 1.200 inch and the agitator pulley diameter was 1.655 inches. The belts were statically loaded to 300–350 oz. initially. Center to center distance from the motor shaft to the idler pulley assembled was 3.123 inches. Center to center distance from the idler pulley to the agitator pulley assembled was 5.777 inches.

The operation of the idler pulleys 50, 52 and belt system 48, 54 for the motor-fan unit 20 can now be easily ascertained. Since shaft 74 is mounted with the motor-fan unit 20 and the bracket 68 which mounts the pulley 50, 52 is also mounted with the motor-fan unit 20, movement of the motor-fan unit 20 on its resilient vibration isolation arrangement is fully accomodated by the system, the center to center distance between the shaft 74 and the motor shaft 46 remaining constant. This tends to insure that the flat belt 48 remains aligned and properly tracking, the alignment of such a flat belt being much more critical than that of the alignment of a V-belt like belt 54.

As was mentioned earlier, the deflection characteristics of the elastomeric belt 48 and the relatively inextensible V-belt 54 are different in that the deflection characteristics of the elastomeric belt 48 can be non-linear, that is as the load on this belt increases the deflection increases increasingly for each unit of additional load. Because of this, an unbalanced force F imposed on the system by a stalled agitator 56 loads the relatively inextensible V-belt 54 so that a proportionate increment of extension occurs. At the same time, however, as this load F is transferred to the flat elastomeric belt 48, the belt 48 can be said to stretch "more" thus reducing the center to center distance between the idler pulley arrangement 50, 52 and the agitator 56 loosening the V-belt 54 on its pulley 52 obviously reducing the tensioning of the belt against the pulley 52 and permitting the V-belt 54 to slip. Since the elastomeric flat belt 48 is thereby permitted to continue to move, no burn out of it occurs and no stall condition occurs at the motor shaft 46 so that the motor of the motor-fan unit 20 is protected from a burn out condition.

Figure 5:
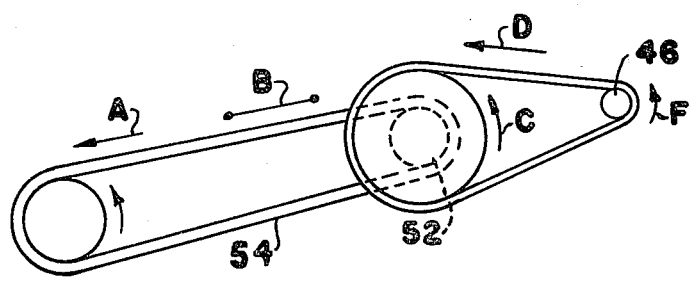
FIG. 5 is a general schematic of the pulley belt system.

The operation is shown schematically in FIG. 5 wherein the arrow A and headed line B indicated the movement or non-movement of the belt 54. At the same time, the pulley 52 can be seen by the arrow C to be constantly rotating as driven by the belt 48 (arrow D), rotation being imparted to the system by the shaft 46, shown in movement by the arrow F.

It will be appreciated that the arrangement described provides such trackingin alignment of a flat belt arrangement and also prevents stall conditions at the motor or flat belt and destruction of either of them. It will also be appreciated that the invention can take many forms and that the embodiment illustrated and described is exemplary only.

What we claim is:

1. An overload arrangement for a cleaner bottom including;
(a) an elastomeric stretchable belt extending to a pivoted idler pulley structure,
(b) a relatively unstretchable belt extending to said idler pulley structure,
(c) one of said stretchable belt and said relatively unstretchable belt being trained over a driving motor shaft,
(d) the other of said stretchable belts and unstretchable belt being trained over said agitator whereby a stalled condition at said agitator causes said unstretchable belt to slip on said idler pulley structure to prevent a stall condition to said motor shaft, and
(e) a pivot for said pivoted idler pulley structure being resiliently mounted relative to said cleaner bottom.

2. An idler pulley structure for a cleaner including;
(a) an idler pulley arrangement for training a pair of belts thereon,
(b) one of said belts extending to a shaft of a motor,
(c) the other of said belts extending to an agitator for said cleaner,
(d) said motor being mounted on resilient means so as to allow movement while driving said belts, and
(e) a bracket directly mounted with said motor, said bracket mounting said idler pulley arrangement to insure good tracking of said motor shaft belt.

3. An overload arrangement for a cleaner agitator as set out in claim 1 wherein;
(a) said pivoted idler pulley structure swings to permit said slippage.

4. The overload arrangement for a cleaner agitator as set out in claim 1 wherein;
(a) said stretchable belt is trained over said motor shaft.

5. The idler pulley structure for a cleaner as set out in claim 2 wherein;
(a) one of said belts is relatively inextensible and the other of said belts is stretchable, whereby;
(b) said relatively inextensible belt slips relative to said idler pulley arrangement upon agitator stall.

6. An overload arrangement for a cleaner agitator including;
(a) an elastomeric stretchable belt extending to a pivoted idler pulley structure,
(b) a relatively unstretchable belt extending to said idler pulley structure,
(c) one of said stretchable belt and said relatively unstretchable belt being trained over a driving motor shaft,
(d) the other of said stretchable belt and unstretchable belt being trained over said agitator whereby a stalled condition at said agitator causes said unstretchable belt to slip on said idler pulley structure to prevent a stall condition to said motor shaft,
(e) said driving motor is resiliently mounted, and
(f) said idler pulley arrangement is mounted with said motor.

7. An overload arrangement for a cleaner agitator including;
(a) an elastomeric stretchable belt extending to a pivoted idler pulley structure,
(b) a relatively unstretchable belt extending to said idler pulley structure,
(c) one of said stretchable belt and said relatively unstretchable belt being trained over a driving motor shaft,
(d) the other of said stretchable belt and unstretchable belt being trained over said agitator whereby a stalled condition at said agitator causes said unstretchable belt to slip on said idler pulley structure to prevent a stall condition to said motor shaft, and
(e) a bracket extending from said driving motor mounting said idler pulley structure.

8. An idler pulley structure for a cleaner bottom including;
(a) an idler pulley arrangement for training a pair of belts thereon,
(b) one of said belts extending to a shaft of a motor,
(c) the other of said belts extending to an agitator for said cleaner,
(d) said motor mounted with said cleaner bottom so as to drive said belts,
(e) a bracket pivotally mounted relative to said cleaner, said bracket mounting said idler pulley arrangement to insure good tracking of said motor shaft belt, and
(f) a pivot for pivotally mounting said bracket, said pivot being resiliently mounted relative to said cleaner bottom.

* * * * *